(12) United States Patent
Calkins et al.

(10) Patent No.: US 9,368,998 B2
(45) Date of Patent: Jun. 14, 2016

(54) CHARGING MECHANISM WITH GROUND CONTACT AND NON-CONTACT COUPLING

(71) Applicant: GOOGLE INC., Mountain View, CA (US)

(72) Inventors: Willis Calkins, Sunnyvale, CA (US); Ajay Chandra Venkata Gummalla, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 679 days.

(21) Appl. No.: 13/661,875

(22) Filed: Oct. 26, 2012

(65) Prior Publication Data

US 2015/0249358 A1 Sep. 3, 2015

(51) Int. Cl.
*H02J 7/00* (2006.01)
*H02J 7/04* (2006.01)
*H02J 7/02* (2016.01)
*H02J 5/00* (2016.01)

(52) U.S. Cl.
CPC ............... *H02J 7/025* (2013.01); *H02J 5/005* (2013.01); *H02J 7/0052* (2013.01); *H02J 7/04* (2013.01)

(58) Field of Classification Search
USPC ......... 320/108, 109, 114, 107, 115, 112, 137, 320/139, 110, 111, 113, 134, 103, 106, 128, 320/136, 138, 157, 162; 307/104
See application file for complete search history.

(56) References Cited

U.S. PATENT DOCUMENTS

| | | | |
|---|---|---|---|
| 6,028,413 A * | 2/2000 | Brockmann | 320/108 |
| 7,893,655 B2 | 2/2011 | Veselic | |
| 8,013,568 B2 * | 9/2011 | Park et al. | 320/108 |
| 8,098,043 B2 * | 1/2012 | Lin | 320/108 |
| 8,169,185 B2 | 5/2012 | Partovi et al. | |
| 2007/0126393 A1 * | 6/2007 | Bersenev | 320/107 |
| 2008/0084185 A1 * | 4/2008 | Nakazawa | 320/128 |
| 2008/0111518 A1 * | 5/2008 | Toya | 320/108 |
| 2010/0181841 A1 * | 7/2010 | Azancot et al. | 307/104 |
| 2010/0237827 A1 * | 9/2010 | Sip | 320/108 |
| 2010/0315039 A1 * | 12/2010 | Terao et al. | 320/108 |
| 2011/0227536 A1 * | 9/2011 | Bourilkov et al. | 320/112 |
| 2012/0146576 A1 * | 6/2012 | Partovi | 320/108 |
| 2012/0313578 A1 * | 12/2012 | Jung et al. | 320/108 |
| 2013/0127407 A1 * | 5/2013 | Kao | 320/108 |

* cited by examiner

*Primary Examiner* — Alexis A Boateng
(74) *Attorney, Agent, or Firm* — Brake Hughes Bellermann LLP

(57) ABSTRACT

The embodiments provide a device including an enclosure having circuitry associated with the device and a battery configured to power the circuitry, and a power plug receiving unit configured to receive a power plug of a power charger to charge the battery. The power plug receiving unit includes a ground contact that is exposed through the enclosure for contact with a secondary ground contact of the power plug, and an active electrode configured to receive alternating current (AC) energy from the power charger for charging the battery or powering the circuitry via non-contact coupling.

17 Claims, 11 Drawing Sheets

CHARGING MECHANISM WITH GROUND CONTACT AND NON-CONTACT COUPLING

BACKGROUND

Conventional chargers for powering a device and/or charging its battery typically include a center pin for actual charging, and an outer ring for the ground return. Other variations may exist, but, generally, conventional chargers include two contacts—a power contact and a ground contact. For instance, this type of charger is plugged directly into the device, thereby connecting to the power and ground contacts of the device. Within the charger itself, alternating current (AC) power is converted into direct current (DC) power in accordance with the power requirements of the device, which may vary from device to device depending on its power consumption, and DC power is delivered directly to the device in order to power the device and/or charge its battery. As a result, for example, a specific type of laptop computer usually has its own charger. Also, the size of the contacts may be dependent on the amount of power to be delivered. For instance, for larger devices, the location for their charging contacts may be limited since the charging contacts may be relatively large in order to handle increased power requirements typically associated with larger devices.

In addition, technologies have developed contactless chargers, which may charge devices via energy coupling such as capacitive coupling or inductive coupling. Capacitive coupling transfers energy within an electric field by means of the capacitance between circuit nodes. Capacitive coupled chargers typically have a relatively large active electrode and an even larger ground electrode. For example, because there is not a direct ground return, the ground electrode in the charger may be as large as the device itself in order to complete the charging circuit. Similarly, the device is equipped with an active electrode and a relatively large ground electrode. As such, when the device is placed in close proximity to the charger (e.g., placed on top of the charger), the capacitive coupled charger transfers charging energy to the device via the active electrodes and provides the ground path via capacitive coupling using the large ground electrodes. Decreasing the size of the ground electrode may greatly reduce the efficiency of the power transfer. Inductive coupling operates in a similar manner except coils are used to create a magnetic field, and energy is transferred via the magnetic field. Nonetheless, in both cases, due to the relative large size of the ground contact, contactless chargers are often bulky and difficult to travel with. Furthermore, for high-powered devices, the conventional contactless chargers may not be as efficient as the conventional contact chargers due to energy loss from the contactless coupling.

SUMMARY

The details of one or more implementations are set forth in the accompanying drawings and the description below. Other features will be apparent from the description and drawings, and from the claims.

The embodiments provide a device including an enclosure having circuitry associated with the device and a battery configured to power the circuitry, and a power plug receiving unit configured to receive a power plug of a power charger to charge the battery. The power plug receiving unit includes a ground contact that is exposed through the enclosure for contact with a secondary ground contact of the power plug, and an active electrode configured to receive alternating current (AC) energy from the power charger for charging the battery or powering the circuitry via non-contact coupling.

According to one embodiment, the non-contact coupling may include capacitance coupling. Also, the non-contact coupling may include inductive coupling. The power plug receiving unit may include an inner circular portion and an outer circular portion. The inner circular portion may include the ground contact, and the outer circular portion may include the active electrode. The inner circular portion and the outer circular portion may be separated by a material such that the ground contact is electrically isolated from the active electrode.

The device may further include a rectification unit configured to convert the AC energy to direct current (DC) energy. According to one embodiment, the rectification unit may include a down transformer configured to downscale the AC energy, a rectifier configured to convert the downscaled AC energy to DC energy, and a DC-to-DC converter configured to generate a plurality of DC energy levels based on the DC energy.

Further, the active electrode may be configured to transfer the AC energy to a mobile device including near field communication (NFC) capabilities.

The device may further include a power charging negotiator configured to determine power requirements of the device and communicate the power requirements to the power charger, where the device may receive the AC energy according to the determined power requirements.

The device may further include an antenna configured to wirelessly transmit data to the power charger.

The embodiments may provide a power charger for providing energy to a device. The power charger includes a power unit configured to receive alternating current (AC) power from an external power source, and a power plug configured to provide AC energy to the device based on the AC power received from the external power source. The power plug includes a ground contact that is exposed to the device for contact with a secondary ground contact of the device, and an active electrode configured to provide the AC energy to the device via non-contact coupling.

The non-contact coupling may include capacitance coupling. The non-contact coupling may include inductive coupling. The power plug may include an inner circular portion and an outer circular portion. The inner circular portion may include the ground contact, and the outer circular portion may include the active electrode.

The power unit may include an up-transformer configured to upscale a voltage of the AC power, and a frequency up-converter configured to upscale a frequency of the AC power, where the active electrode may be configured to provide the AC energy having the upscaled frequency and voltage.

The power unit may include a power charging negotiator configured to receive wirelessly receive power requirements of the device, and a power controller configured to adjust the AC charging energy according to the power requirements.

The power charger may further include an antenna configured to wirelessly receive data from the device, and an output port configured to provide the data to an external device connected to the output port.

The embodiments may provide a charging system including a power charger including a power unit configured to receive alternating current (AC) power from an external power source, and a power plug configured to supply AC energy based on the AC power. The power plug may include a first ground contact, and a first active electrode configured to provide the AC energy via non-contact coupling. The charging system may also include a device including a battery, circuitry, and a power plug receiving unit. The power plug receiving unit may be configured to receive the power plug. The power plug receiving unit may include a second ground contact, and a second active electrode configured to receive the AC energy from the first active electrode via the non-contact coupling. The first ground contact and the second ground contact are connected to each other, and the battery is charged or the circuitry is powered based on the AC energy.

The non-contact coupling may include capacitance coupling. The non-contact coupling may include inductive coupling. The power unit may include an up-transformer configured to upscale a voltage of the AC power, and a frequency up-converter configured to upscale a frequency of the AC power, where the first active electrode is configured to provide the AC energy having the upscaled frequency and voltage to the second active electrode.

The device may further include a down transformer configured to downscale the AC energy, a rectifier configured to convert the downscaled AC energy to direct current (DC) energy, and a DC-to-DC converter configured to generate a plurality of DC energy levels based on the DC energy.

DETAILED DESCRIPTION

Figure 1:
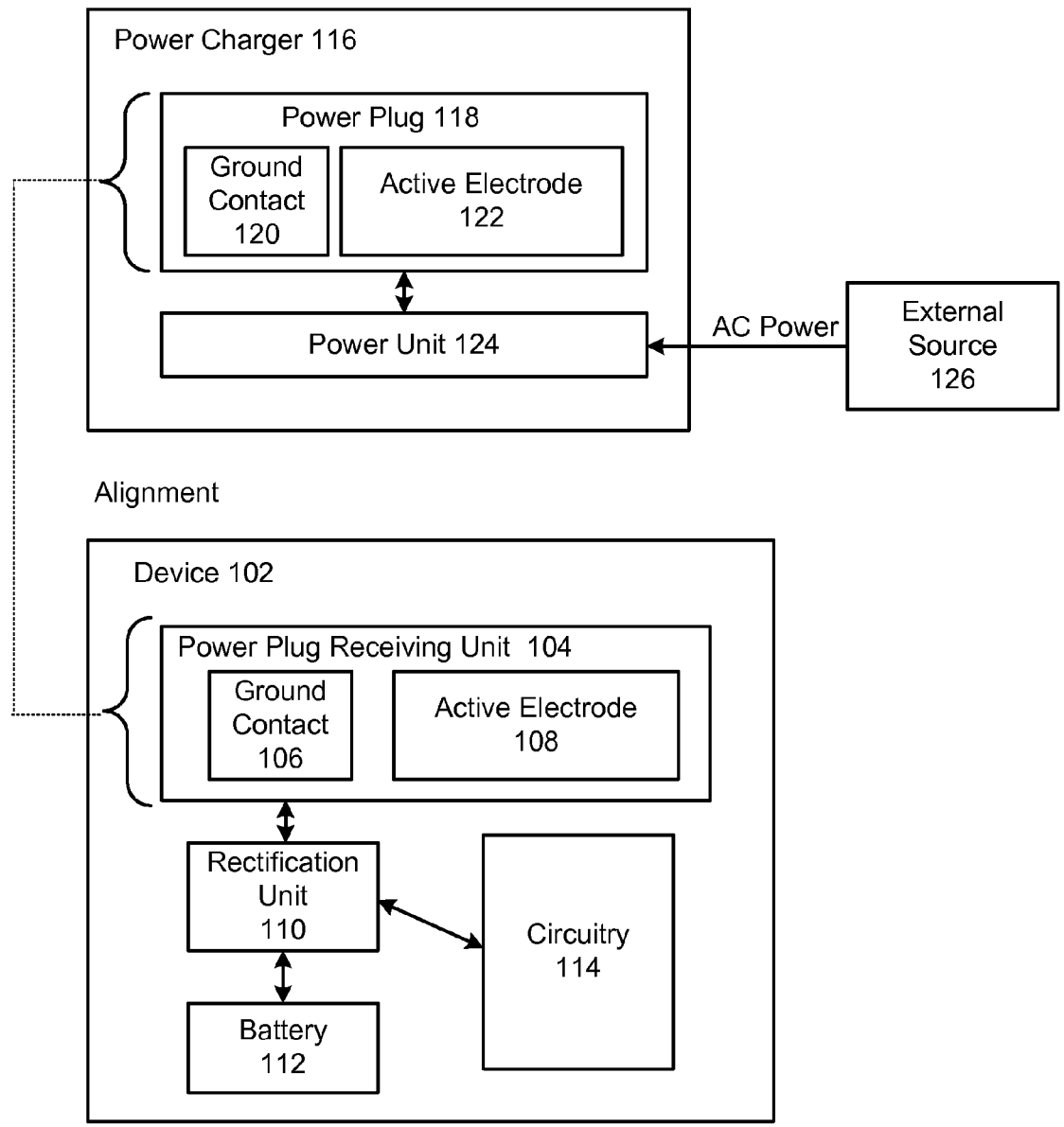
FIG. 1 illustrates a block diagram of a charging system including a device and a power charger for charging/powering the device according to an embodiment.

Embodiments provide a charging mechanism that couples power to a device via contactless coupling (e.g., capacitive or inductive) and provides a ground return through a physical contact. For example, instead of using a large ground electrode within the charger, the embodiments provide an exposed ground contact for the ground return, where energy is transferred to the device using the active electrodes via contactless coupling. In one example, the ground contact may be an exposed metallic surface (e.g., very thin), which may be magnetic that aligns with the ground contact of the device in order to maintain the connection between the device and the charger. Thus, when the ground contacts are aligned, energy is coupled via the active electrodes in a contactless manner. As a result, the components of the charging mechanism require a relatively smaller area than conventional contactless charging solutions, enable a relatively thin plug option (e.g., two thin metallic surfaces that are aligned), and permit the power charger to be located at any flat/curved surface on the device. Further, the structure of this charging mechanism on the device may permit seamless switching between this charging mechanism and conventional contactless charging solutions.

For example, the embodiments include a power charger having a power plug that is configured to provide alternating current (AC) energy to the device, where the power plug includes a ground contact that is exposed to the device for contact with a ground contact of the device, and an active electrode configured to provide the AC energy to the device via non-contact coupling (e.g., capacitive or inductive). Also, the embodiments include a device having a power plug receiving unit that is configured to receive the power plug of the power charger, where the power plug receiving unit includes a ground contact that is exposed to make contact with the ground contact of the power charger, and an active electrode configured to receive the AC energy for charging its battery or powering its circuitry via the non-contact coupling.

In further examples, for mobile devices equipped with near field communications (NFC) capabilities, the active electrode of the device (e.g., which is being charged by the charger) may be shared with an NFC antenna of the NFC-enabled mobile device such that its battery may also be charged along with the battery of the device. In addition, the power charger may have logic that determines the power requirements of the device via a communication antenna, and then configures the energy to be provided to the device in accordance with the power requirements of the device. In another example, the power charger may include a high frequency antenna embedded in its power plug/power unit for the receiving of data (e.g., video, audio), and one or more output port configured to output the received data to an external device. These and other features are further explained below with reference to the figures.

FIG. 1 illustrates a block diagram of a charging system 100 including a device 102 and a power charger 116 for charging/powering the device 102 according to an embodiment.

The power charger 116 may be any type of device that is configured to receive power from an external source 126, and provide energy to the device 102. In contrast to conventional power chargers having a center pin and ground contact, because the charging system 100 utilizes capacitive or inductive coupling for the transfer of energy, the power charger 116 may receive AC power from the external source 126, and provide a signal representing AC energy to the device 102, whereby the device 102 may convert the AC energy into one or more levels of direct current (DC) power to be supplied to its circuitry 114 and/or battery 112, as further explained below.

The power charger 116 may include a power unit 124 configured to receive the AC power from the external source 126, and a power plug 118 configured to provide the AC energy to the device based on the AC power received from the external source 126. For example, the power unit 124 may receive the AC power from the external source 126 and convert this power into a power signal for energy coupling, where the power signal includes the AC energy. In one example, the power unit 124 may be configured to modify the frequency, voltage, and/or current of the received AC power including increasing or decreasing the frequency, voltage, and/or current of the received AC power.

The power plug 118 may include a ground contact 120 for making a connection with a ground contact 106 of the device 102, and an active electrode 122 configured to provide the AC energy to the device 102 via non-contact coupling. The ground contact 120 may include a physical contact such as a pin, ring, or pad. In one embodiment, the ground contact 120 may be a thin metallic surface (or referred as ground pad), which is exposed. The metallic surface also may be magnetic in order to allow the ground contacts to be aligned. However, the embodiments encompass any type of physical structure including the ground contact 120. For example, regardless of the actual physical structure of the ground contact 120, at least a portion of the ground contact 120 (e.g., a ground point) is exposed from the power charger 116 such that the ground contact 120 may be directly connected to the ground contact 106 of the device 102.

The active electrode 122 may be configured to provide the AC energy to the device via non-contact coupling. For example, the active electrode 122 may be any type of electrode that is configured to transfer the AC energy in a contactless coupling manner. The contactless coupling may include capacitive coupling or inductive coupling. Capacitive coupling may be the transfer of energy within an electrical field by means of capacitance between nodes, e.g., the active electrode 122 and an active electrode 108 of the device 102. Capacitive coupling is typically achieved by placing a capacitor in series with the signal (e.g., the AC energy) to be coupled. As such, the active electrode 122 may include one or more capacitors that are arranged to transfer energy to a receiving electrode such as the active electrode 108 of the device 102 in an electric field. Inductive coupling may be the transfer of energy within a magnetic field by means of wires or coils. As such, with respect to inductive coupling, the active electrode 122 may include one or more inductors such as magnetically charged coils or wires that are capable of actively transmitting energy to a receiving electrode such as the active electrode 108 of the device 102 in a magnetic field.

In contrast to the ground contact 120, the active electrode 122 is not exposed. Rather, the active electrode 122 remains concealed from the point of view of the user. The active electrode 122 may be concealed by the enclosure of the power charger 116. As such, the power charger 116 may provide a hidden active electrode (e.g., the active electrode 122) with an exposed ground contact (e.g., the ground contact 120), which may prevent the charging circuit to be short-circuited.

The device 102 may be any type of device that is capable of being charged by a power charger, which may include laptops, netbooks, mobile phones, smartphones, desktop computers, or tablets, for example. The device 102 may include a power plug receiving unit 104 that is configured to receive the power plug 118 of the power charger 116. For example, to establish a power charging connection, the power plug 118 of the power charger 116 may be aligned with the power plug receiving unit 104 by a user. In this respect, in the event that the ground contacts 120, 106 are magnetic, the power plug 118 and the power plug receiving unit 104 may be coupled together via the magnetic ground pads, which may permit the power plug 118 and the power plug receiving unit 104 to properly align. In other examples, the power plug 118 and the power plug receiving unit 104 may have structural configurations that permit the power plug 118 and the power plug receiving unit 104 to latch, where the structural configurations encompass a wide variety of physical latching mechanisms.

The power plug receiving unit 104 may include the ground contact 106 for providing a return ground path when connected to the contact 120 of the power charger 116, and an active electrode 108 for receiving the AC energy in a contactless manner via the capacitive coupling or the inductive coupling. Similar to the ground contact 120, the ground contact 106 may include a physical contact such as a pin, ring, or pad. In one embodiment, the ground contact 106 may be a thin metallic surface (or referred as ground pad), which is exposed. The metallic surface also may be magnetic in order to allow the ground contacts to be aligned. However, the embodiments encompass any type of physical structure including the ground contact 106. For example, regardless of the actual physical structure of the ground contact 106, at least a portion of the ground contact 106 (e.g., a ground point) is exposed from the device 102 (e.g., through its enclosure) such that the ground contact 106 may be directly connected to the ground contact 120 of the power charger 116.

Similar to the active electrode 122, the active electrode 108 may be any type of electrode that is configured to receive the AC energy in a contactless coupling manner such as the capacitive or inductive coupling. With respect to the capacitive coupling, the active electrode 108 may include one or more capacitors that are arranged to receive energy from a transmitting electrode such as the active electrode 122 of the power plug 118 via an electric field. With respect to the inductive coupling, the active electrode 108 may include one or more inductors such as magnetically charged coils or wires that are capably of actively receiving energy from a transmitting electrode such as the active electrode 122 of the power plug 118 within a magnetic field.

The rectification unit 110 may be configured to receive the transferred AC energy and convert the AC energy into one or more levels of DC power. Further, the rectification unit 110 may be configured to downscale or upscale the transferred AC energy to one of a lower or higher frequency, voltage, or current level, and then convert the downscaled or up-scaled AC energy into one or more levels of DC power. For example, if the device 102 requires multiple levels of DC power, the rectification unit 110 may be configured to generate the multiple DC levels based on the received AC energy or the downscaled or up-scaled AC energy.

The battery 112 may include any type of battery known to one of ordinary skill in the art, and the circuitry 114 includes standard process circuitry associated with the device 102. For example, if the device 102 is a laptop computer, the circuitry 114 may include process components that are well known to laptop computers. The DC power level(s) may be provided to power the circuitry 114 and/or charge the battery 112.

Figure 2:
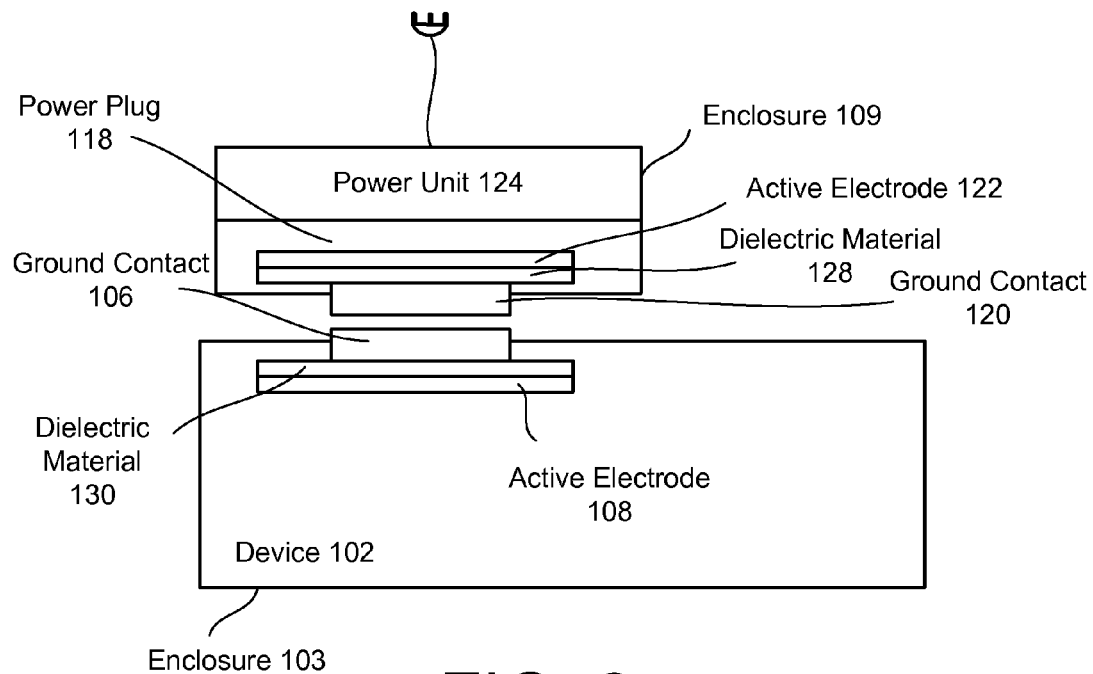
FIG. 2 illustrates a more detailed view of the device and the power charger depicting the exposure of the ground contacts according to an embodiment.

FIG. 2 illustrates a more detailed view of the device 102 and the power charger 116 depicting the exposure of the ground contacts 106, 120 according to an embodiment. For example, the power charger 116 may be latched to the device 102 via the power plug receiving unit 104. As shown in FIG. 2, the device 102 may have an enclosure 103 that encloses its components including a portion of the power plug receiving unit 104, as well as the rectification unit 110, the battery 112, and the circuitry 114 shown in FIG. 1. However, the ground contact 106 of the power plug receiving unit 104 may be exposed outside the enclosure 103 in order to permit contact with the ground contact 120 of the power charger 116.

In one embodiment, the active electrode 108 of the device 102 may surround the ground contact 106. Alternatively, the active electrode 108 may be located adjacent to the ground contact 106. However, the embodiments encompass any type of configuration of the ground contact 106 in relation to the active electrode 108, and vice versa, including a circular configuration, as shown with respect to FIG. 3. However, according to the embodiments, the active electrode 108 is concealed or hidden, while the ground contact 106 is exposed. In addition, a dielectric material 130 may be placed between the ground contact 106 and the active receiving electrode in order to ensure that they do not contact each other. For instance, the dielectric material 130 may electrically isolate the ground contact 106 from the active electrode 108.

Similarly, with respect to the power plug 118, the ground contact 120 is exposed through an enclosure 109 housing the components of the power charger 116 so that the ground contact 120 may be connected to the ground contact 106 of the device 102. In one embodiment, the active electrode 122 of the power plug 118 may surround the ground contact 106. Alternatively, the active electrode 122 may be located adjacent to the ground contact 120. However, the embodiments encompass any type of configuration of the ground contact 120 in relation to the active electrode 122, and vice versa, including the circular configuration, as shown with respect to FIG. 3. According to the embodiments, the active electrode 122 is concealed or hidden, while the ground contact 120 is exposed. In addition, a dielectric material 128, which may be the same or different than the dielectric material 130, may be placed between the ground contact 120 and the active electrode 122 in order to ensure that they do not contact each other. In other words, the dielectric material 130 electrically isolates the ground contact 120 from the active electrode 122. Regardless of the specific arrangement of these components, the active electrode 108 and the ground contact 106 of the device 102 may substantially line up with the active electrode 122 and the ground contact 120, respectively, of the power charger 116 when the power plug 118 and the power plug receiving unit 104 are linked together, in order to provide charge to the device 102.

Figure 3:
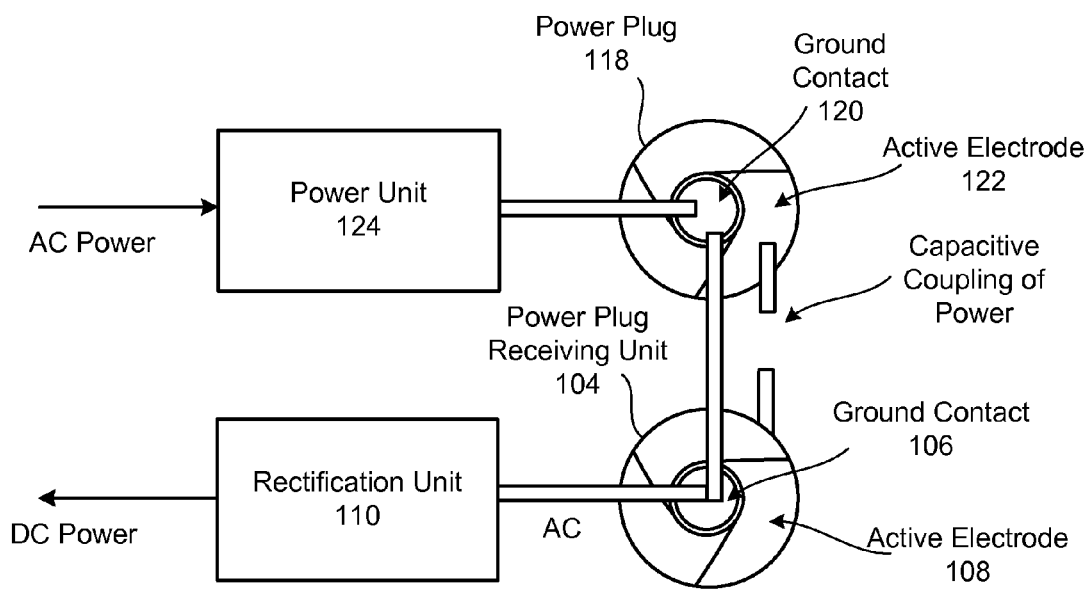
FIG. 3 illustrates the charging system of FIG. 1 according to another embodiment.

FIG. 3 illustrates the charging system 100 of FIG. 1 according to another embodiment. For example, FIG. 3 illustrates a top view of the power plug 118 and the power plug receiving unit 104. In this example, with respect to both the power plug 118 and the power plug receiving unit 104, each ground contact 120, 106 is located in the center of the power plug 118/power plug receiving unit 104, whereas each active electrode 108, 122 may surround the ground contact 120, 106. When the power plug 118 is coupled to the power plug receiving unit 104 (e.g., the power plug 118 is placed on top of the power plug receiving unit 104 and magnetically held in place), the ground contacts 106 and 120 form a direct connection such that a ground return is established, and the AC energy is transferred from the active electrode 122 to the active electrode 108 via capacitive/inductive coupling. In particular, the power unit 124 may receive the AC power from the external source 126, and provide the AC energy to the power plug 118 by coupling the energy between the active electrodes 108, 122 such that the rectification unit 110 can convert the transferred AC power to the appropriate level(s) of DC power.

Figure 4A:
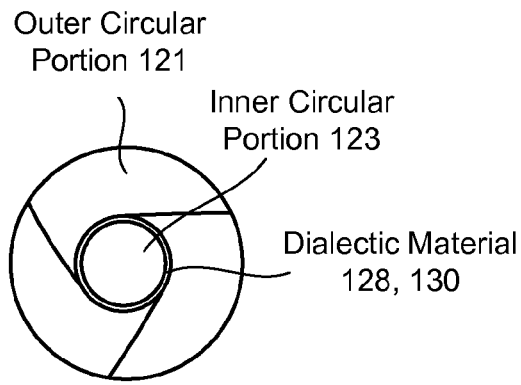
FIGS. 4(a), 4(b) and 4(c) illustrate different views of the power plug and power plug receiving unit according to example embodiments.
Figure 4B:
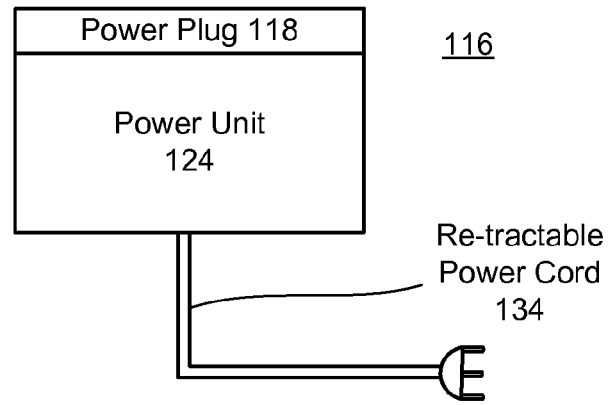
Figure 4C:
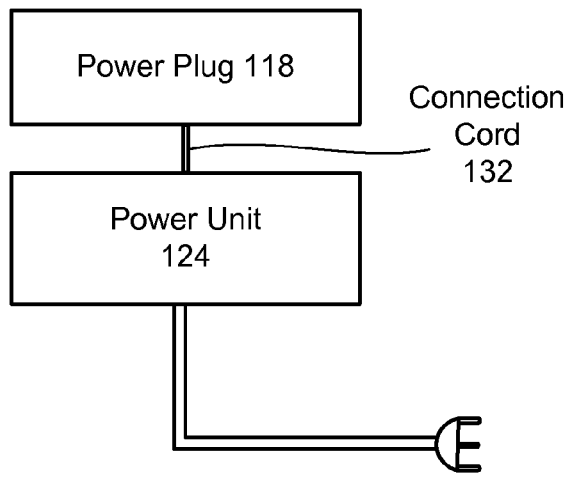

FIGS. 4(a), 4(b) and 4(c) illustrate different views of the power plug 118 and power plug receiving unit 104 according to example embodiments. For example, FIG. 4(a) illustrates a top view of the power plug 118/power plug receiving unit 104, which is similar to FIG. 3. As shown in FIG. 4(a), the power plug 118 and the power plug receiving unit 104 may have an outer circular portion 121 and an inner circular portion 123 that are separated or electrically isolated by the dialectric material 128, 130. The outer circular portion 121 may include the active electrode 108, 122, and the inner circular portion 123 may include the ground contact 106, 120. Also, the inner circular portion 123 and the outer circular portion 121 may be separated or electrically isolated by the dialectic material 128, 130. Furthermore, as explained above, the ground contacts 106, 120 may be exposed though the surface. In other words, by placing the ground contact 106 in contact with the ground contact 120, the connection forms a ground return. In contrast, the active electrode 108, 122 are concealed by a material overlapping the active electrode 108, 122, which may be the enclosure of the device 102/power charger 116 as shown in FIG. 2, or a material separate from the enclosure that is used to cover the active electrode 108, 122.

FIG. 4(b) illustrates the power charger 116 including a retractable power cord 134 according to an embodiment. In this example, the power charger 116 includes the power plug 118 and the power unit 124, and the retractable power cord 134 is connected to the power unit 124. In this embodiment, the retractable power cord 134 may retract into the power unit 124, which permits the length of the power cord 134 to be adjustable depending on the user's preference. FIG. 4(c) illustrates the power charger 116 including a connection cord 132 for connecting the power plug 118 to the power unit 124. For example, the embodiments encompass the situation when the power plug 118 and the power unit 124 are embodied into a single component, and when the power plug 118 and the power unit 124 are separate components that are connected to each other via the connection cord 132. The connection cord 132 may be any type of cord that permits the transfer to AC charging energy to the power pug 118 for capacitive or inductive coupling.

Figure 5:
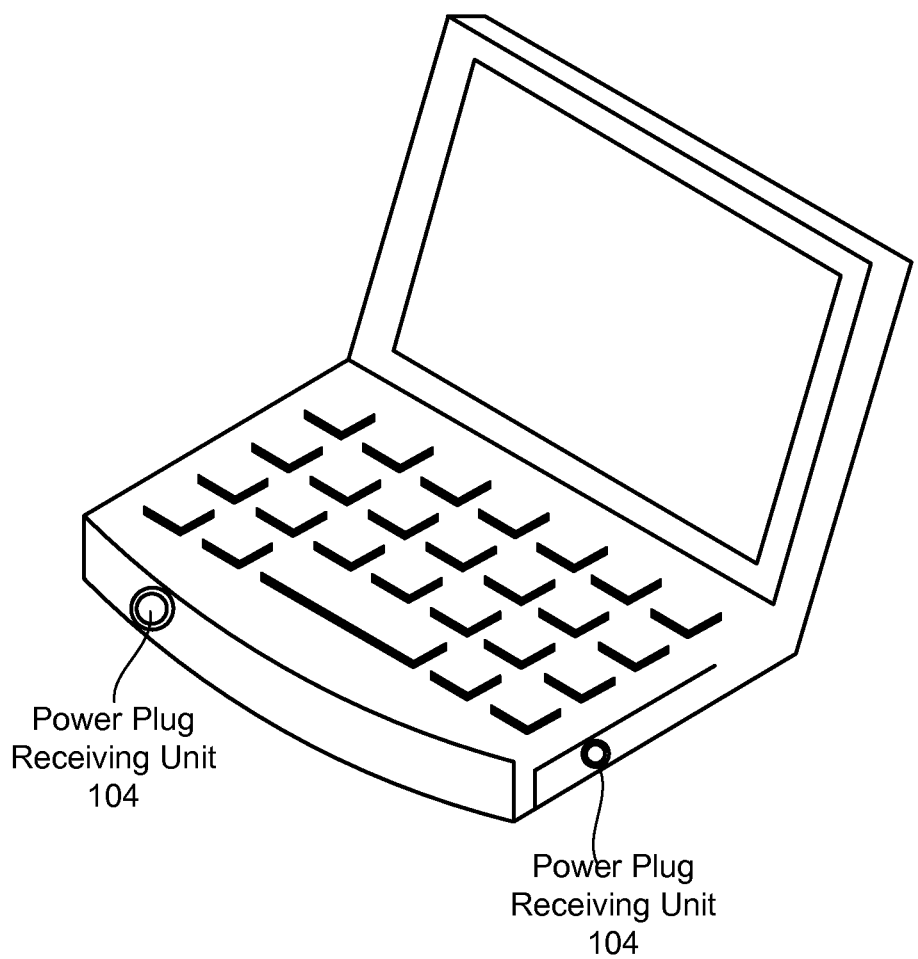
FIG. 5 illustrates the device as a laptop computer having multiple power plug receiving units according to an embodiment.

FIG. 5 illustrates the device 102 as a laptop computer having multiple power plug receiving units 104 according to an embodiment. For example, due to the structure of the power plug receiving unit 104, the device 102 may be able to provide multiple places for charging. For instance, the power plug receiving unit 104 may be located on a front portion, side portion, and/or back portion of the device 102, or generally, any type of flat, or even curved, section of the device 102. Also, the device 102 may include a plurality of power plug receiving units 104 in order to provide the user with flexibility for charging the device 102.

Figure 6:
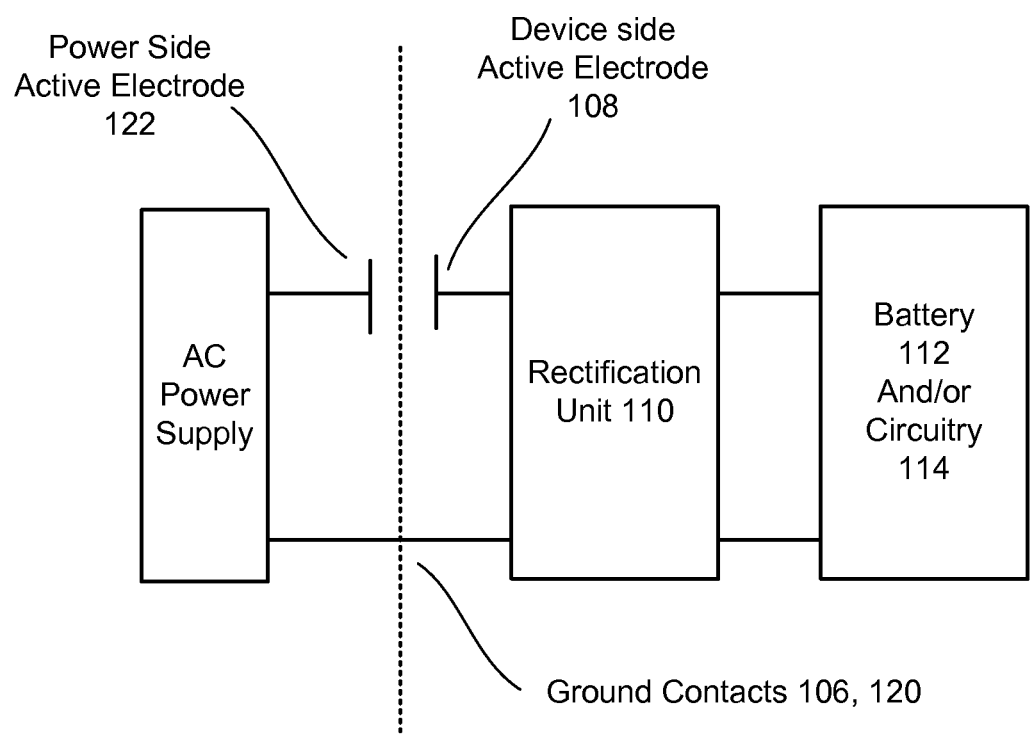
FIG. 6 illustrates an electrical diagram of the charging system depicting capacitive coupling according to an embodiment.

FIG. 6 illustrates an electrical diagram of the charging system 100 depicting capacitive coupling according to an embodiment. In this embodiment, the battery 112 is charged or the circuitry 114 is powered via capacitive coupling. As shown in FIG. 6, the active electrodes 122/108 are implemented via a capacitor. However, the capacitor may be a number of capacitors that form the active electrodes 122/108. On the power side, the power charger 116 may receive the AC power supply, and provide the AC energy to the power side active electrode 122, which transfers it to the active electrode 108 on the device side. Furthermore, in order to complete the circuit, the ground contacts 106, 120 are directly connected to each other in order to form a ground path return. As a result, the rectification unit 110 may receive the transferred AC energy and convert the received AC energy to one or more levels of DC power to be supplied to the battery 112 and/or the circuitry 114.

Figure 7:
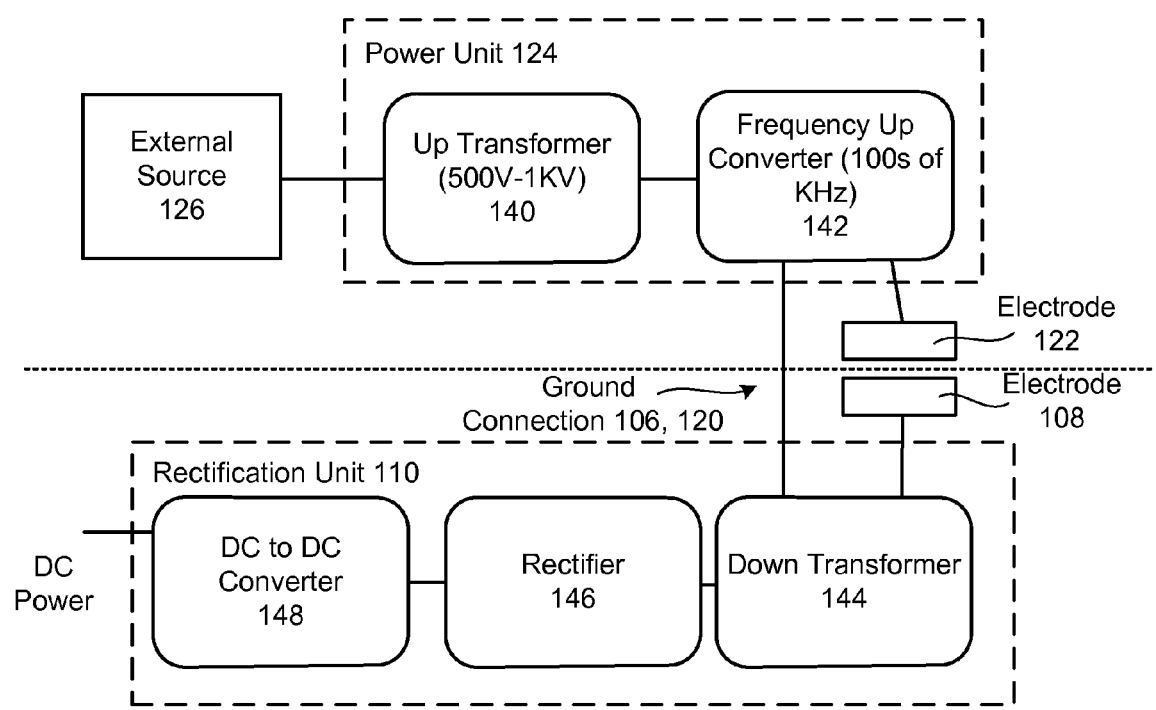
FIG. 7 illustrates a more detailed version of the power charger and the device according to an embodiment.

FIG. 7 illustrates a more detailed version of the power charger 116 and the device 102 according to an embodiment. For example, in one implementation, the power unit 124 of the power charger 116 may include an up-transformer 140 configured to upscale the voltage of the AC power from the external source 126, and a frequency up-converter 142 configured to upscale the frequency of the AC power. As explained above, the energy transfer is facilitated by contactless coupling between the active electrodes 122, 108, while providing a direct physical connection between the ground contacts 106, 120. As such, the active electrode 122 provides the AC energy having the up-scaled frequency and voltage to the active electrode 108 on the device side. When received on the device side, the rectification unit 110 may include a down transformer 144 configured to downscale the voltage and/or frequency, a rectifier 146 configured to convert the down-scaled AC power to DC power, and a DC-to-DC converter 148 configured to generate a plurality of DC energy levels in the case that the components of the circuitry 114 require multiple power levels.

Figure 8:
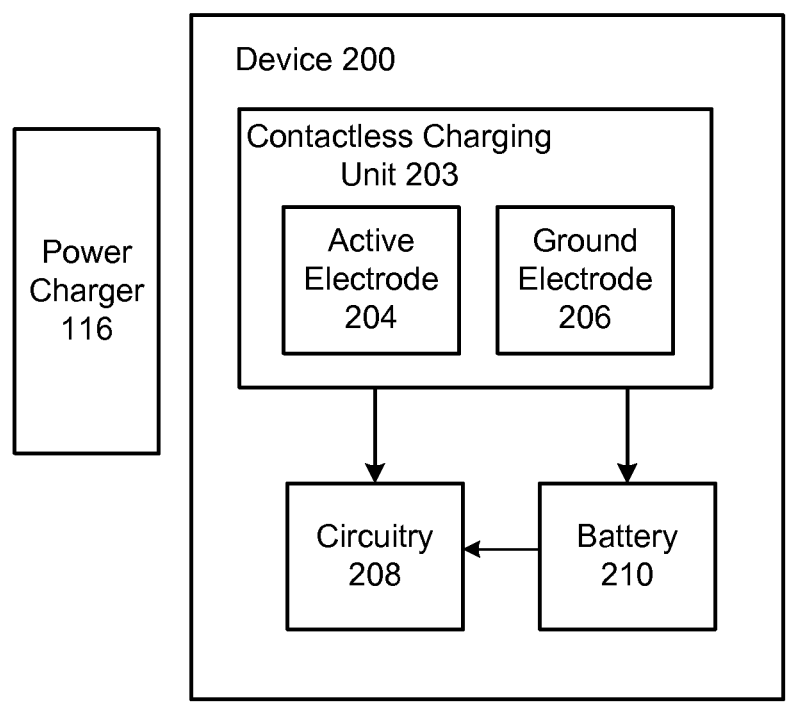
FIG. 8 illustrates the power charger charging a device having a contactless charging unit according to an embodiment.

FIG. 8 illustrates the power charger 116 charging a device 200 having a contactless charging mechanism. Referring to FIG. 8, the device 200 may be any type of device such as a laptop, desktop, smartphone, phone, or tablet, for example, which includes a contactless charging unit 203. The contactless charging unit 203 may include an active electrode 204 and a ground electrode 206, as well as other components that are well known to one of ordinary skill in the art such as an AC-to-DC converter. The contactless charging unit 203 may be configured to receive AC charging energy via contactless coupling such as the capacitive or inductive coupling. As indicated in the background section, the ground electrode 206 is typically much larger than the active electrode 204. The device 200 may also include circuitry 208, and a battery 210. The circuitry 208 may include components that are well know for carrying out operating of the device 200, and the battery 210 may be any type of battery known to one of ordinary skill in the art.

According to an embodiment, the power charger 116 may be configured to charge the device 200 having the contactless charging mechanism. For example, the active electrode 122 may provide AC charging energy to the active electrode 204, while the ground contact 120 of the power charger 116 may indirectly be connected to the ground electrode 206. In this manner, although not as efficient as using the power plug receiving unit 104 of the embodiments, energy may be transferred to the device 102 having the contactless charging unit 203 via the active electrodes. Accordingly, the user may have the benefit of charging the device 200 with a contactless charger. However, because contactless chargers are relatively bulky and not well suited for traveling, the device 200 may be charged with the power charger 116 of the embodiments, which is smaller and more compact. In other words, the power charger 116 may be compatible with the device 102 or the device 200.

Figure 9:
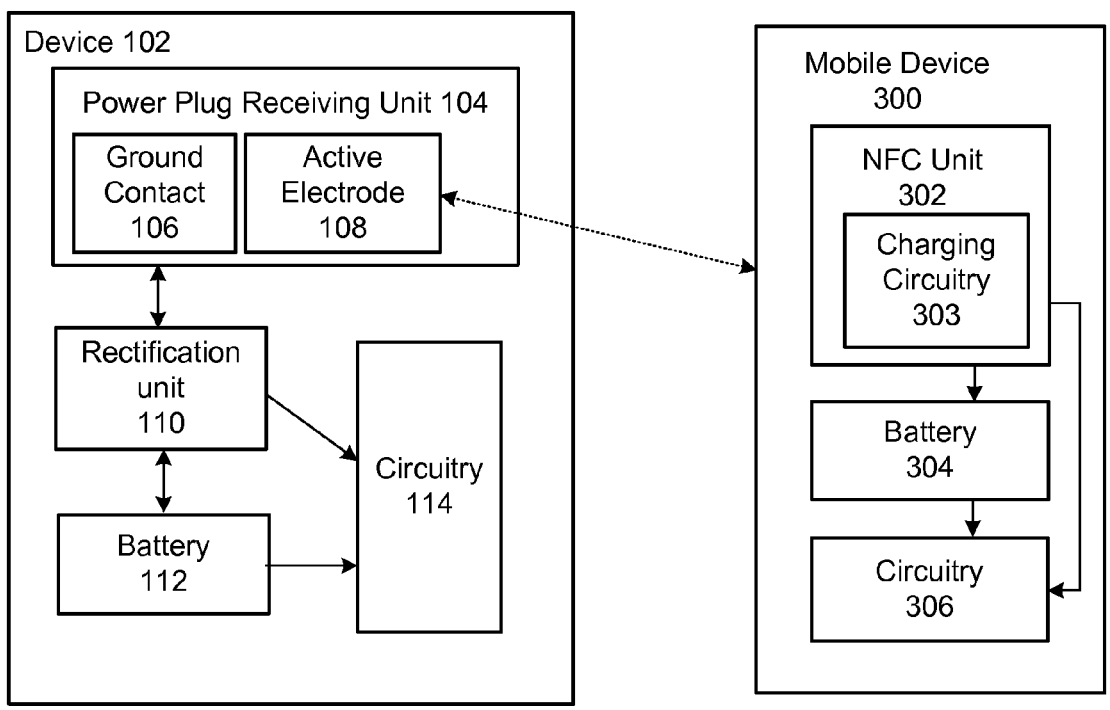
FIG. 9 illustrates a mobile device capable of being charged by the device according to an embodiment.

FIG. 9 illustrates a mobile device 300 capable of being charged by the device 102 according to an embodiment. Referring to FIG. 9, the device 102 may include the power plug receiving unit 104 having the ground contact 106 and the active electrode 108, the rectification unit 110, the battery 112, and the circuitry 114, which all have been explained reference to the preceding figures. In this example, a mobile device 300 may charge its battery 304 or power its circuitry 306 using the active electrode 108 of the power plug receiving unit 104. For instance, similar to a mobile phone being charged by a laptop computer via a USB cable, in this example, the mobile device 300 may be charged by the active electrode 108 if the mobile device 300 is equipped with near field communication (NFC) capabilities. NFC may be considered a set of standards for smartphones and similar devices to establish radio communication with each other by touching them together or bringing them into close proximity, e.g., a few centimeters.

The mobile device 300 may include an NFC unit 302, which includes standard functionality for implementing NFC capabilities. However, according to the embodiments, the NFC unit 302 may also include charging circuitry 303 configured to receive AC energy from the power plug receiving unit 104. For example, typically, a mobile device 300 equipped with NFC capabilities establishes a data connection with another device such that data can be communicated between the two devices. However, the charging circuitry 303 provides the additional functionality of establishing a connection with the active electrode 108 of the device 102 such that AC energy may be transferred to the NFC unit 302. Therefore, the active electrode 108 may share the received energy from the power charger 116 with the mobile device 300 via an NFC connection, which may charge the battery 304 and/or power the circuitry of the mobile device 300.

Figure 10:
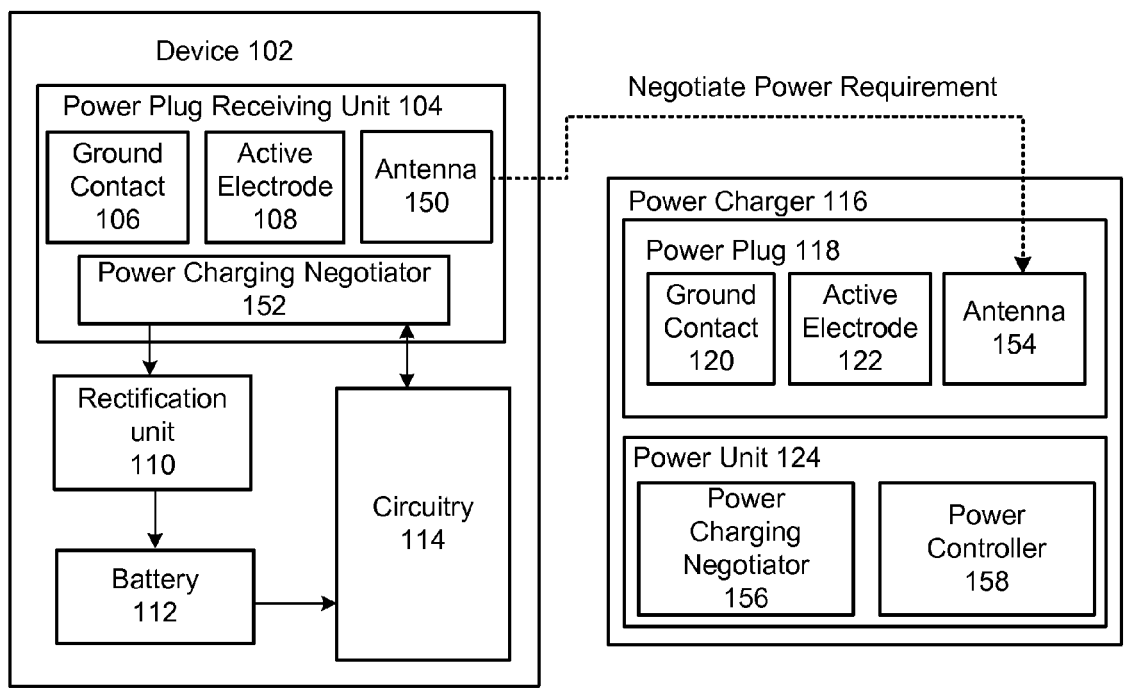
FIG. 10 illustrates a power requirement negotiation mechanism using the device and the power charger according to an embodiment.

FIG. 10 illustrates a power requirement negotiation mechanism using the device 102 and the power charger 116 according to an embodiment. For instance, in this example, the power charger 116 and the device 102 may establish a data connection in order to dynamically determine the power requirements of the device 102 so that the power charger 116 can subsequently deliver the appropriate amount of power to the device 102. As a result, when incorporating this type of technology, the power charger 116 may be used for a variety of different types of devices 102, which may have different power requirements. For example, the power charger 116 may dynamically determine the type of power for the particular device 102, and then provide such power in order to accurately meet its power requirements.

Referring to FIG. 10, the power plug receiving unit 104 may include the ground contact 106, the active electrode 108, an antenna 150, and a power charging negotiator 152. It is also noted that the antenna 150 and the power charging negotiator 152 may be associated with the rectification unit 110 or other components included the circuitry 114. The antenna 150 may be any type of antenna capable of establishing a data connection for the transmission/receipt of data. The power charging negotiator 152 may be configured to communicate with the circuitry 114, and determine the power requirements of the device 102 such as the required voltage, current and/or frequency to charge the battery 112 and/or power the circuitry 114. Then, the power charging negotiator 152 may wirelessly transmit power requirement information via the antenna 150 to the power charger 116, where the power requirement information includes the determined power requirements of the device 102 such as the required voltage, current and/or frequency to charge the battery 112 and/or power the circuitry 114.

The power charger 116 may wirelessly receive the power requirement information, and dynamically adjust the delivered power to the device 102. For example, the power plug 118 of the power charger 116 may include the ground contact 120, the active electrode 122, and an antenna 154 for wirelessly establishing a connection with the device 102, and for receiving the power requirement information. The antenna 155 may be any type of antenna capable of establishing a data connection for the transmission/receipt of data.

The power unit 124 may include a power charging negotiator 156, and a power controller 158. The power charging negotiator 156 may be configured to communicate with the power charging negotiator 152 of the device 102 via the antennas 150, 154, in order to wirelessly obtain the power requirement information. Then, the power controller 158 may be configured to adjust the delivered power. For instance, power controller 158 may receive the AC power from the external source 126, and then upscale or downscale the voltage, current, and frequency of the AC power according to the power requirement information. Accordingly, the active electrode 122 may transfer the adjusted power to the active electrode 108 of the power plug receiving unit 104 when the ground contacts 106, 120 are connected to each other. Then, the device 102 may process the received AC energy in a manner that was explained with reference to the previous figures, e.g., up-scaling/downscaling the received energy, and converting the AC power to one or more DC power levels.

Figure 11:
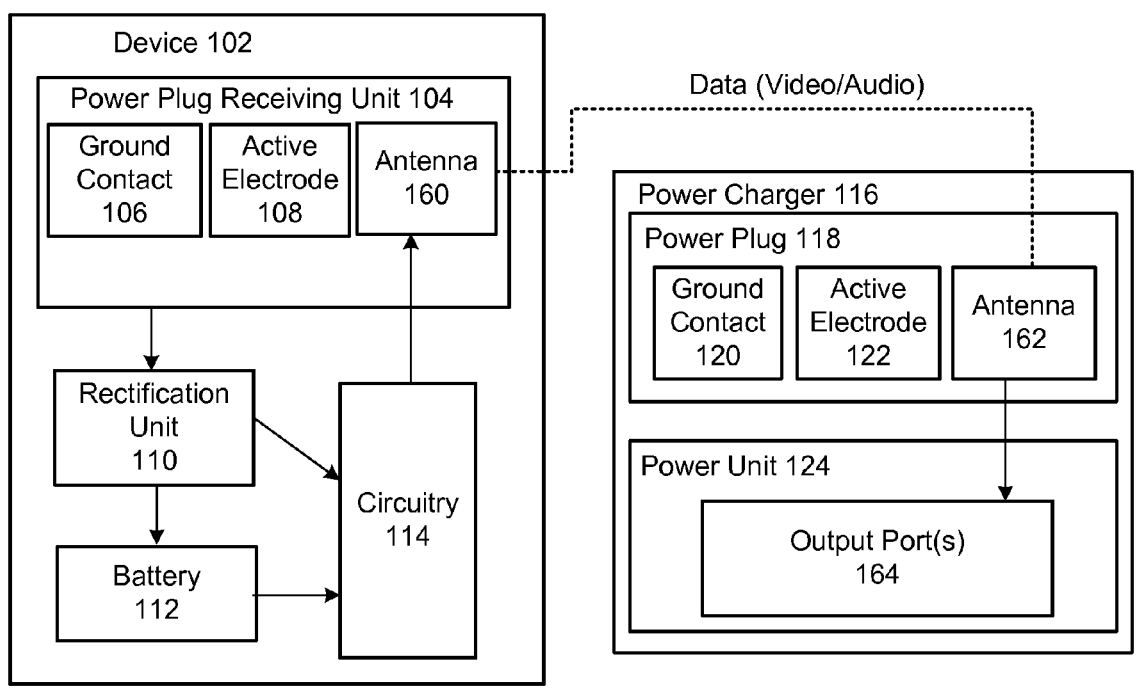
FIG. 11 illustrates a data transfer mechanism between the device and the power charger according to an embodiment.

FIG. 11 illustrates a data transfer mechanism between the device 102 and the power charger 116 according to an embodiment. In this example, the device 102 may establish a data connection with the power charger 116, and then wirelessly transfer data to the power charger 116 such as video and/or audio data. The power unit 124 of the power charger 116 may be equipped with one or more output ports 164 such that an external device may be connected to the power charger 116 via the one or more output port 164 in order to relay the video and/or audio data for display on the external device. As such, the device 102 does not necessarily have to provide output ports on the device 102, and, as a result, will permit the device 102 to be smaller in size and/or less in weight.

Referring to FIG. 11, the power plug receiving unit 104 may include the ground contact 106, the active electrode 108, and an antenna 160. Also, it is noted that the antenna 160 may be associated with the rectification unit 110 or other components in the circuitry 114. The antenna 160 may be any type of antenna designed for the transfer of video and/or audio data. According to the embodiments, the circuitry 114 may provide the data to be transferred to the antenna 160, which then communicates the data to the power charger 116.

The power plug 118 of the power charger 116 may include the ground contact 120, the active electrode 122, and an antenna 162. Also, it is noted that the antenna 162 may be associated with the power unit 124 or other components associated with the power charger 116. Similar to the antenna 160, the antenna 162 may be any type of antenna designed for the data transfer of video and/or audio data. According to the embodiments, the antenna 162 may wirelessly receive the data transferred from the device 102, and provide the data to the output ports 164. The output ports 164 may be any type of output port designed to output audio and/or video data. For example, the output ports 164 may include an S-Video port, USB port, VGA port, HGMI port, memory card reader, and/or generally, any type of port commonly found on laptop computers, for example. Depending on the type of output port, the device 102 and the power charger 116 may wirelessly exchange data via an interface that supports such an output port. In particular, if the output port 164 includes a VGA port, the antenna 160 transmits the video/audio data according to the VGA interface. Also, the output ports 164 may be capable of receiving a connection cord or cable from an external device such that the transferred data may be relayed to the external device via the output ports 164.

Figure 12:
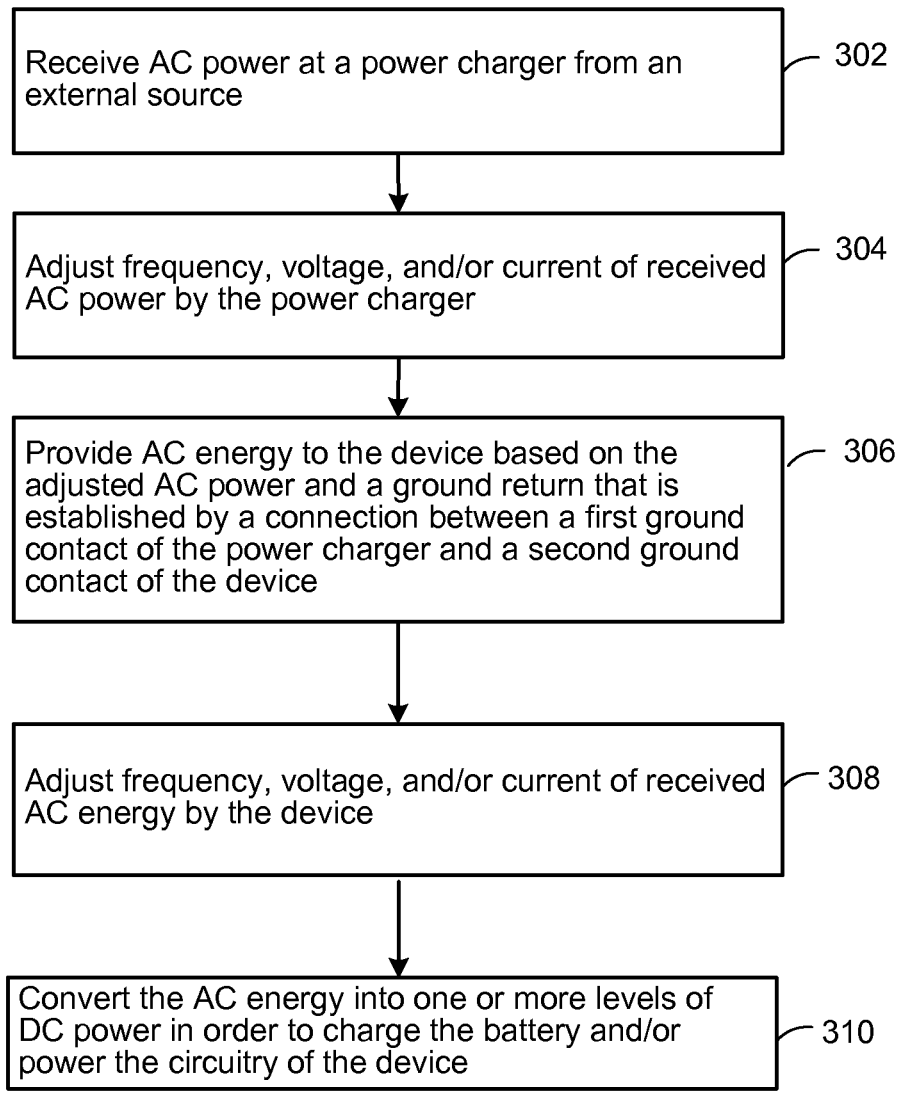
FIG. 12 illustrates a flowchart depicting example process steps for charging or powering a device according to an embodiment.

FIG. 12 illustrates a flowchart depicting example operating for charging or powering a device according to an embodiment. Although the flowchart of FIG. 12 illustrates the operations in sequential order, it will be appreciated that this is merely an example, and that additional or alternative operations may be included. Further, operations of FIG. 12 and related operations may be executed in a different order than that shown, or in a parallel or overlapping fashion.

AC power may be received at a power charger from an external source (302). For example, the power charger 116 may receive the AC power from the external source 126. In particular, the power unit 124 of the power charger 116 may receive the AC power from the external source 126, which may include plugging a cord or cable into a wall outlet configured to supply power.

Frequency, voltage, and/or current of the received AC power may be adjusted (304). For example, if the non-contact coupling includes capacitive coupling, the power unit 124 may include an up-transformer 140 configured to upscale the voltage of the AC power, and a frequency up-converter configured to upscale the frequency of the AC power. If the non-contact coupling includes inductive coupling, the power unit 124 may have a current adjuster configured to upscale/downscale the current of the AC power.

AC energy may be provided to the device based on the adjusted AC power, and a ground return may be established by a connection between a first ground contact of the power charger and a second ground contact of the device (306). For example, the power unit 124 may convert the AC power into a power signal for energy coupling, where the power signal includes the AC energy. Also, as explained above, the power charger 116 may include the power plug 118 having the active electrode 122 and the ground contact 120, and the device 102 may include the power plug receiving unit 104 having the active electrode 108 and the ground contact 106.

In one embodiment, the ground contacts 120, 106 may be thin metallic surfaces (or referred as ground pads), which are exposed. The metallic surfaces also may be magnetic in order to allow the ground contacts 120, 106 to be aligned. As such, when the ground contacts 120, 106 are connected to each other, the ground return path is established. Then, the active electrode 122 of the power charger 116 may be configured to provide the AC energy to the device 102 via non-contact coupling. For example, the active electrode 122 may be any type of electrode that is configured to transfer the AC energy in a contactless coupling manner. In particular, with respect to capacitive coupling, the active electrode 122 may include one or more capacitors that are arranged to couple AC energy in an electric field. With respect to inductive coupling, the active electrode 122 may include one or more inductors such as magnetically charged coils or wires that are capable of coupling AC energy in a magnetic field.

Frequency, voltage, and/or current of the received AC energy may be adjusted by the device (308). For example, with respect to the capacitive coupling, the active electrode 108 of the device 102 may include one or more capacitors that are arranged to receive energy from a transmitting electrode such as the active electrode 122 of the power plug 118 via the electric field. With respect to the inductive coupling, the active electrode 108 may include one or more inductors such as the magnetically charged coils or wires that are capably of actively receiving energy from a transmitting electrode such as the active electrode 122 of the power plug 118 within the magnetic field. Then, the rectification unit 110 may include the down transformer 144 configured to downscale at least one of the frequency, the voltage and the current.

The AC energy may be converted into one or more levels of DC power in order to charge the battery and/or power the circuitry of the device (310). For example, the rectifier 146 may be configured to convert the AC energy to DC power, and the DC-to-DC converter 148 may be configured to generate a plurality of DC power levels based on the converted DC power.

It will be appreciated that the above embodiments that have been described in particular detail are merely example or possible embodiments, and that there are many other combinations, additions, or alternatives that may be included.

What is claimed is:

1. A device comprising:
   an enclosure having circuitry associated with the device and a battery configured to power the circuitry; and
   a power plug receiving unit configured to receive a power plug of a power charger to charge the battery, the power plug receiving unit including a ground contact that is exposed through the enclosure for contact with a secondary ground contact of the power plug such that the ground contract and the secondary ground contact, when coupled, create a ground return, an active electrode configured to receive alternating current (AC) energy from the power charger for charging the battery or powering the circuitry via non-contact coupling, and a dielectric material disposed between the active electrode and the ground contact such that the ground contact is electrically isolated from the active electrode.

2. The device of claim 1, wherein the non-contact coupling includes capacitance coupling or inductive coupling.

3. The device of claim 1, wherein the device is a laptop computer having a display portion rotatably coupled to a base portion, and the power plug receiving unit is disposed on a side portion of the base portion.

4. The device of claim 1, wherein the power plug receiving unit includes an inner circular portion and an outer circular portion, the inner circular portion including the ground contact, and the outer circular portion including the active electrode.

5. The device of claim 4, wherein the inner circular portion and the outer circular portion are separated by the dielectric material.

6. The device of claim 1, further comprising:
   a rectification unit configured to convert the AC energy to direct current (DC) energy.

7. The device of claim 6, wherein the rectification unit includes:
   a down transformer configured to downscale the AC energy;
   a rectifier configured to convert the downscaled AC energy to DC energy; and
   a DC-to-DC converter configured to generate a plurality of DC energy levels based on the DC energy.

8. The device of claim 1, wherein the active electrode is configured to transfer a portion of the AC energy to a near field communication (NFC) antenna of a mobile device such that the battery of the device and a battery of the mobile device is simultaneously changed.

9. The device of claim 1, further comprising:
   a power charging negotiator configured to determine power requirements of the device; and
   a communication antenna configured to wirelessly transmit the power requirements of the device to the power charger, wherein the device receives a level of AC energy according to the determined power requirements.

10. The device of claim 1, further comprising:
    an antenna configured to wirelessly transmit at least one of video data and audio data to the power charger.

11. The device of claim 1, wherein the ground contact includes a magnetic ground pad.

12. The device of claim 1, wherein the active electrode completely surrounds the ground contact.

13. The device of claim 1, wherein the active electrode is concealed by the housing and the ground contact is exposed through the housing.

14. A device comprising:
    an enclosure having circuitry associated with the device and a battery configured to power the circuitry; and
    a power plug receiving unit configured to receive a power plug of a power charger to charge the battery, the power plug receiving unit including:
       a ground contact that is exposed through the enclosure for contact with a ground contact of the power plug such that the ground contract and the secondary ground contact, when coupled, create a ground return;
       an active electrode configured to receive alternating current (AC) energy from the power charger for charging the battery or powering the circuitry via non-contact coupling;
       a dielectric material disposed between the active electrode and the ground contact such that the ground contact is electrically isolated from the active electrode; and
       at least one antenna configured to wirelessly communicate with the power charger, the at least one antenna being configured to transmit power requirement information of the device to the power charger such that the device receives AC energy according to the power requirement information.

15. The device of claim 14, wherein the non-contact coupling includes capacitance coupling.

16. The device of claim 14, wherein the non-contact coupling includes inductive coupling.

17. The device of claim 14, wherein the at least one antenna is configured to transmit video and audio data to the power charger.

* * * * *